(12) United States Patent
Barnes et al.

(10) Patent No.: US 6,585,421 B1
(45) Date of Patent: Jul. 1, 2003

(54) SPACER AND STRAIN RELIEF FOR FIBER OPTIC CONNECTORS

(75) Inventors: Brandon A. Barnes, Ft. Worth, TX (US); Daniel Leyva, Jr., Arlington, TX (US)

(73) Assignee: Corning Cable Systems LLC, Hickory, NC (US)

( * ) Notice: Subject to any disclaimer, the term of this patent is extended or adjusted under 35 U.S.C. 154(b) by 29 days.

(21) Appl. No.: 09/662,942

(22) Filed: Sep. 15, 2000

(51) Int. Cl.[7] .............................. G02B 6/36; G02B 6/38
(52) U.S. Cl. ........................................... 385/53; 385/59
(58) Field of Search ............................. 385/53, 59, 56, 385/62, 55, 70, 71, 72, 96, 98, 97

(56) References Cited

U.S. PATENT DOCUMENTS

| | | | | |
|---|---|---|---|---|
| 4,229,876 A | * | 10/1980 | Doty | 29/469 |
| 4,606,603 A | * | 8/1986 | Cairns | 385/58 |
| 4,708,433 A | * | 11/1987 | Kakii et al. | 174/70 R |
| 4,964,688 A | * | 10/1990 | Caldwell et al. | 385/54 |
| 5,221,170 A | * | 6/1993 | Duffy et al. | 156/158 |
| 5,487,123 A | * | 1/1996 | Fowble | 411/387.1 |
| 5,620,634 A | * | 4/1997 | Shahid | 264/1.25 |
| 5,625,737 A | * | 4/1997 | Saito | 29/748 |
| 5,806,175 A | * | 9/1998 | Underwood | 148/DIG. 128 |
| 6,001,664 A | * | 12/1999 | Swirhun et al. | 385/59 |
| 6,004,042 A | * | 12/1999 | Million et al. | 385/59 |
| 6,173,097 B1 | * | 1/2001 | Throckmorton et al. | 385/59 |
| 2001/0036342 A1 | * | 11/2001 | Knecht et al. | 385/84 |

* cited by examiner

*Primary Examiner*—Georgia Epps
*Assistant Examiner*—Omar Hindi

(57) ABSTRACT

A spacer is provided to assist in orienting and aligning optical fibers in a connector. The spacer may also provide strain relief for the optical fibers. The spacer is especially useful with smaller optical fibers that are to be used in connectors that are designed for larger optical fibers or cables. Openings extending through the spacer, which may have a channel that allows for communication between the openings. The spacer can have as many openings as there are fibers for the connector. The spacer also assists in holding the fibers during the cleaving process so that the fibers are cleaved simultaneously and consistently.

26 Claims, 7 Drawing Sheets

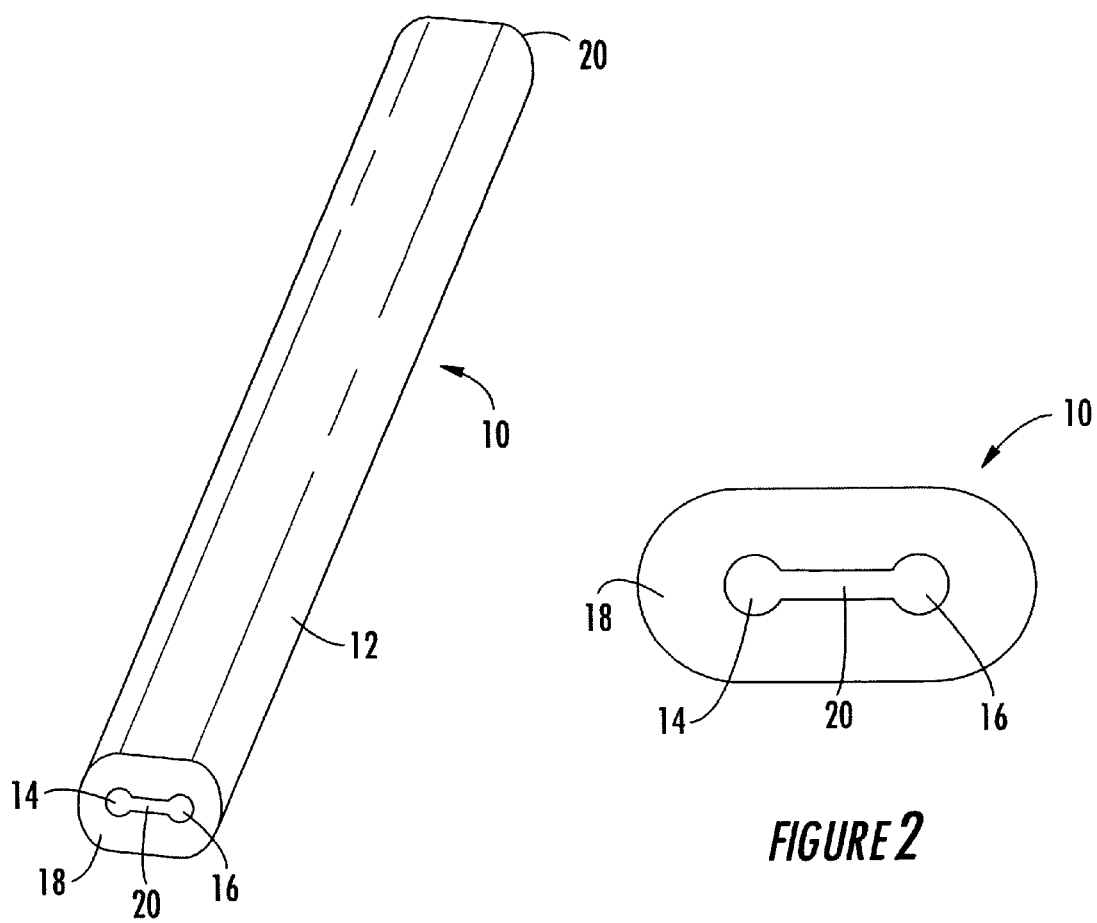
FIGURE 1
FIGURE 2
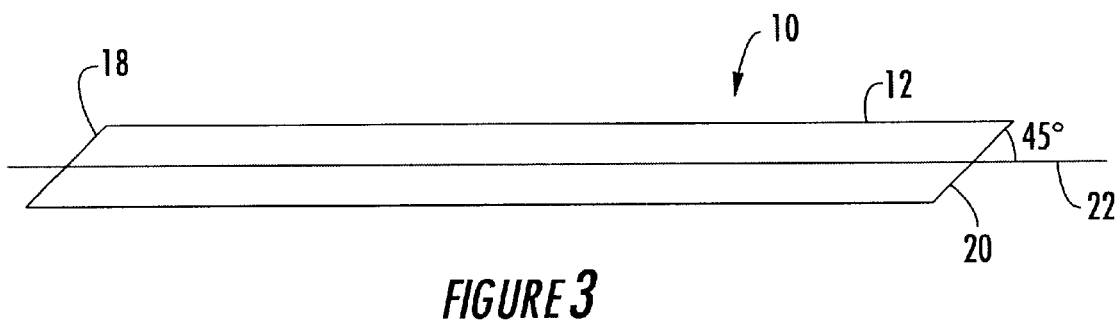
FIGURE 3

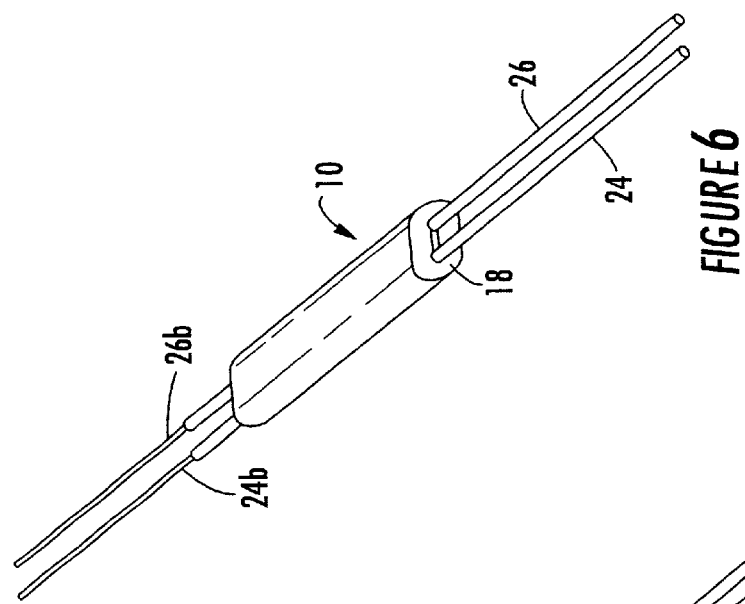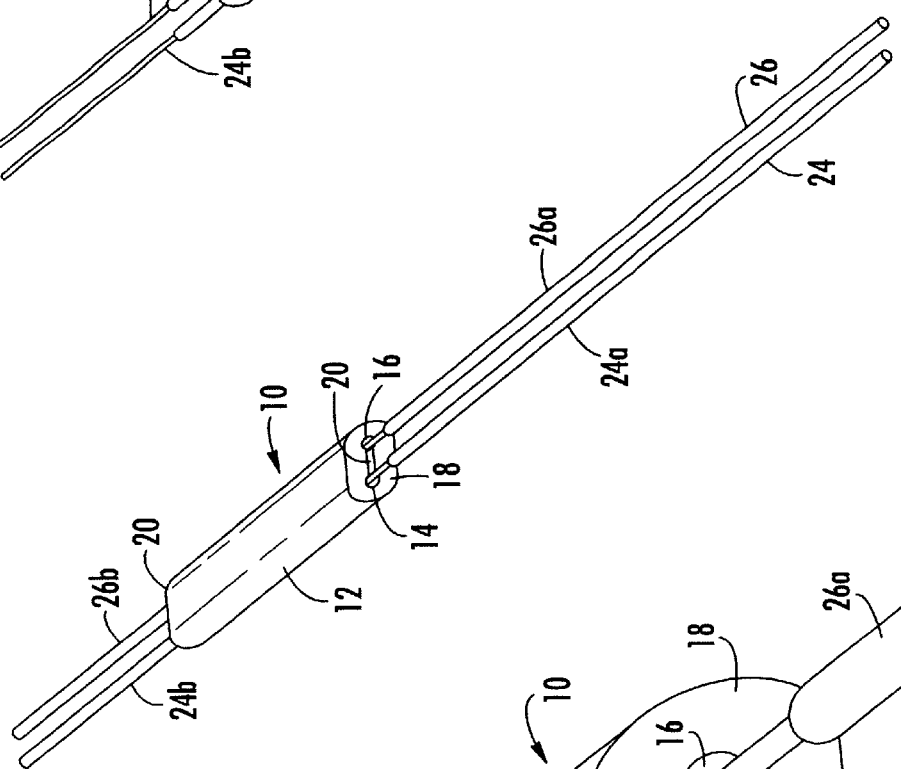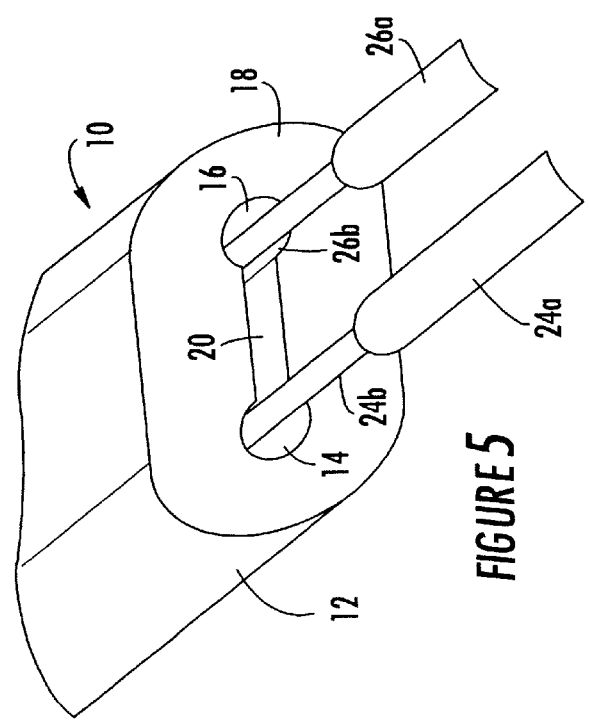

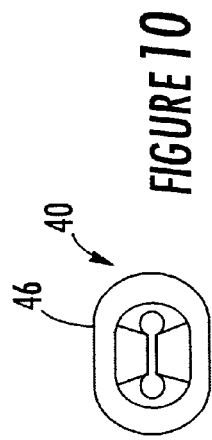
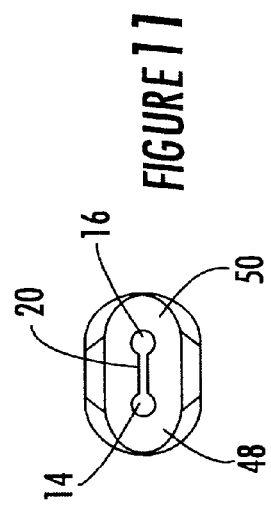
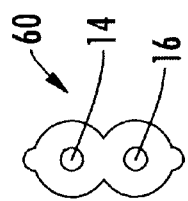
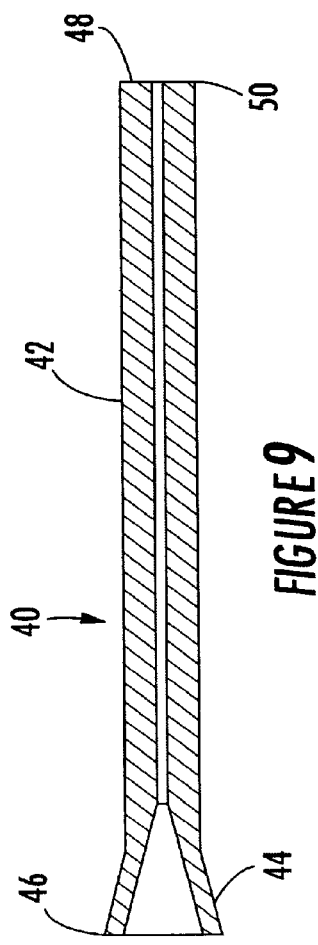

SPACER AND STRAIN RELIEF FOR FIBER OPTIC CONNECTORS

BACKGROUND

The present invention is directed to a spacer and strain relief for a fiber optic connector. More specifically, the spacer and strain relief are designed primarily for use with multi fiber connectors in which inserting the fibers into the individual fiber bores is difficult. In particular, the present invention assists the user to terminate loose-tube type cables or two (or more) individual fibers.

Many of the existing fiber optic connectors have been designed to accommodate 900 micron tight buffered optical cables, which have been prevalent in the industry. However, newer smaller cables are being designed and used. One such cable is the MIC² cable available from Corning Cable Systems of Hickory, N.C., the assignee of this application. Rather than redesigning the connectors (and any associated items) for the smaller cables, it is preferable to be able to retrofit the connector or otherwise accommodate the smaller cables. At the same time, it is necessary to be able to strain relieve these smaller fibers. Since these smaller fibers do not have the additional buffer material around them that the 900 micron tight buffered optical cables do, it is necessary to provide strain relief without simply crimping a crimp band or a lead-in tube around the fibers. Doing so would cause damage to the optical fibers, degrading or even eliminating the signal passing that point.

Thus, a need exists for a spacer and strain relief that can be used with multifiber connectors that assists in spacing the optical fibers and strain relieving the fibers at the same time.

SUMMARY OF THE INVENTION

Among the objects of the present invention is to provide a spacer for a fiber optic connector that spaces the ends of an optical fiber easily and may also be used for strain relief that the same time.

Other objects and advantages of the present invention will become apparent from the following detailed description when viewed in conjunction with the accompanying drawings, which set forth certain embodiments of the invention. The objects and advantages of the invention will be realized and attained by means of the elements and combinations particularly pointed out in the appended claims.

To achieve the objects and in accordance with the purposes of the invention as embodied and broadly described herein, the invention comprises a spacer for use with a multifiber connector, the spacer includes an elongated central element having a first and second end and at least two openings extending between the first and second ends of the elongated central element.

To achieve the objects and in accordance with the purposes of the invention as embodied and broadly described herein, the invention also comprises a resilient elongated central element having a first and second end, and at least two openings extending between the first and second ends of the elongated central element, the openings have centers that are about 750 microns apart.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 1 is a perspective of a spacer according the present invention;

FIG. 2 is an end view of the spacer of FIG. 1;

FIG. 3 is a side elevational view of the spacer of FIG. 1;

FIG. 4 is a perspective view of the spacer of FIG. 1 with optical fibers partially inserted therethrough;

FIG. 5 is an enlarged view of a portion of the spacer and optical fibers of FIG. 4;

FIG. 6 is a perspective view of the spacer of FIG. 1 with the optical fibers fully inserted therethrough;

FIG. 9 is a cross sectional view of another embodiment of a spacer according to the present invention;

FIGS. 10 and 11 are opposing end views of the spacer of FIG. 9;

FIG. 12 is a perspective view of another embodiment of a spacer according to the present invention;

FIG. 13 is an end view of the spacer of FIG. 12;

DETAILED DESCRIPTION OF THE INVENTION

Figure 7:
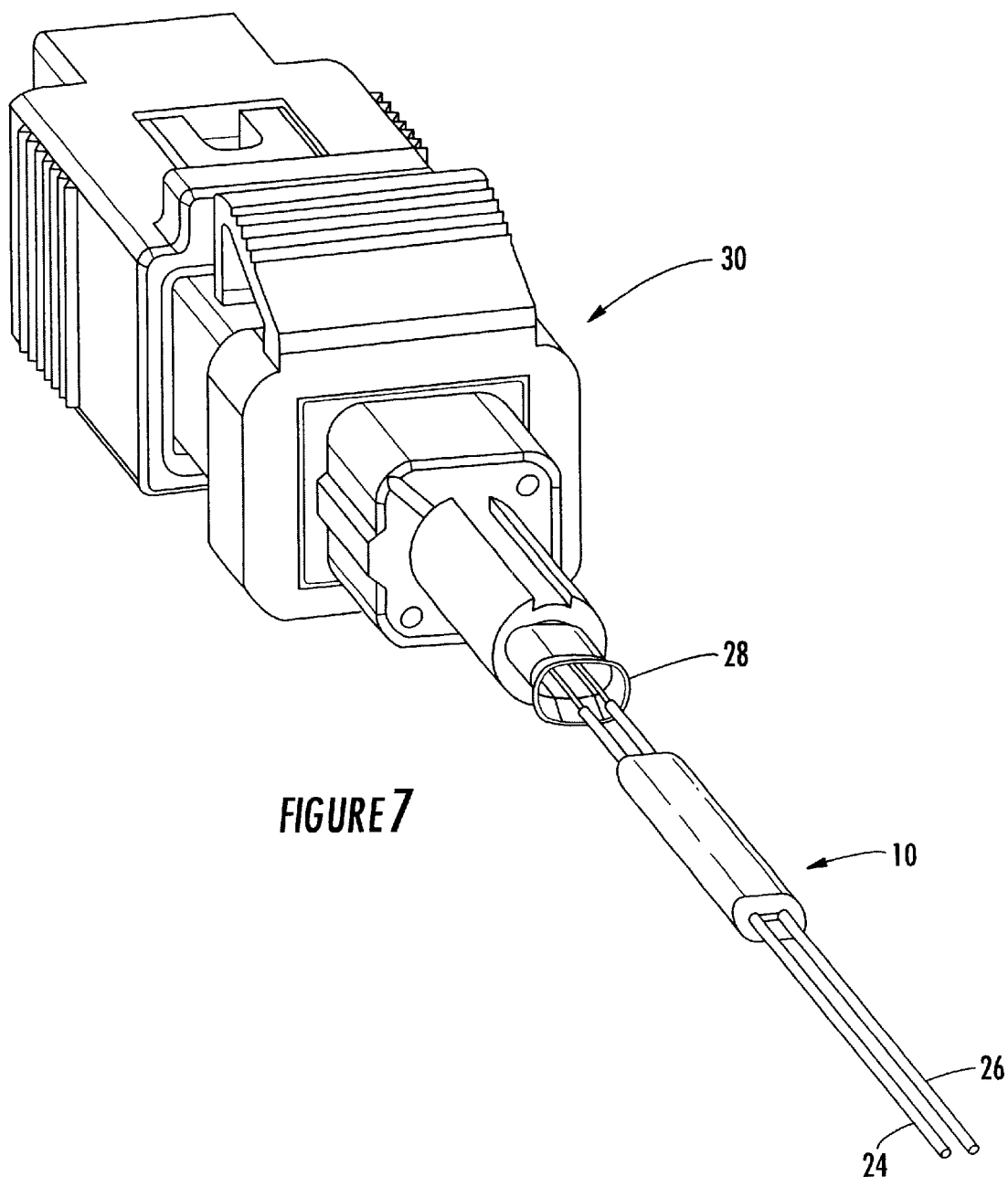
FIG. 7 is a perspective view of a spacer according to the present invention being inserted into a representative connector.

One embodiment of the spacer 10 is shown in FIGS. 1–3. Spacer 10 is preferably an elongated member 12 with two annular openings 14,16 extending between a first end 18 and a second end 20. The spacer 10 preferably has an outer configuration that corresponds to a fiber optic connector designed to receive a 900 micron tightly buffered fibers. While the illustrated spacer 10 is generally oval, it can be of any configuration that centers the optical fibers in the connector. The openings 14,16 are sized to allow a 250 micron (coated) optical fiber to pass through the spacer 10. The two annular openings 14,16 are in communication with one another along the length of member 12 through a channel 20. Channel 20, as shown in the figures, is a generally rectangularly shaped slot that allows only a stripped optical fiber (typically 125 microns in diameter) to pass between the two openings 14,16. As described in more detail below, the size of channel prevents a coated 250 micron fiber from moving between the openings 14,16 and keeps the optical fibers correctly spaced. In the preferred embodiment, the annular openings 14,16 are spaced apart by 750 microns (center-to-center). The spacer 10 is preferably manufactured from Teflon® PTFE fluorocarbon resin, a resilient material. However, any suitable resilient material can be used.

The openings 14,16 are shown to be generally round and extend through the spacer 10. However, the openings could be of any shape, including oval, hexagonal, square, etc., as long as they allow a 250 micron coated optical fiber to pass through the openings. While the openings 14,16 may be of any shape, they must be disposed in the spacer 10 such that the optical fibers have a spacing of 750 microns to match the spacing in the connector. Naturally, if the connector to be used has a fiber bore spacing that is different from 750 microns, then openings would be disposed to match the spacing. Similarly, while the channel 20 is generally shown as a rectangular channel, it also may be of any shape as long as a 125 micron optical fiber can pass between the openings 14,16 but the 250 micron coated optical fibers cannot.

As shown in FIG. 3, the ends 18,20 are preferably slanted at approximately 450 relative to a longitudinal axis 22, which passes through the spacer 10 and is parallel to the openings 14,16. While the ends can be slanted at any angle between 0° and 90°, angles between 30 and 90 are more preferable, and an angle of about 45° is most preferable. Slanted ends 18,20 cause the openings 14,16 to be oval shaped at the end and provide for easier insertion of the fibers into the spacer 10. Also, while both ends are shown to be slanted in the figure, either one of the ends or none of the ends may be slanted.

Only two openings are illustrated in the figures, but the spacer 10 can have any number of openings, depending on the number of optical fibers needed for the connector that will be used. If more than two openings are used in the spacer, alignment of the openings in any certain arrangement is not required. Therefore, the openings can be arranged in a straight line or any other geometric shape (circular, rectangular, triangular, etc.).

The use of the spacer 10 will be described with reference to FIGS. 4–8. Optical fibers 24,26 have two portions as shown in FIGS. 4–6. The portions 24a,26a are the coated optical fibers that are about 250 microns in diameter, while the portions 24b,26b are the stripped portions of the optical fibers 24,26 that are about 125 microns in diameter. As is known in the art, the optical fibers are typically provided with a coating and the user must strip it off before the optical fibers can be terminated with a connector. In the figures, the portion 24b,26b already has the coating stripped off. The optical fibers that are to be connectorized are preferably inserted into one of the openings 14,16. While the fibers could each be inserted into their own opening, the loose fibers tend to align themselves next to one another. Since the openings 14,16 are about 250 microns and the stripped portions are inserted into the spacer 10, the stripped portion of the optical fibers 24,26 will pass through the spacer 10. Once the fibers are inserted such that the coated portions 24a,26a are next to the spacer 10, one of the fibers can then be moved through channel 20 to the other opening as shown in FIGS. 4 and 5. Once the fibers are in their respective openings, the fibers are then inserted such that the coated portions 24a,26a are moved through and partially beyond the opposite end 20 of the spacer 10 as shown in FIG. 6. In this position, the fibers will not be able to move relative to one another and they will keep the spacing of the openings (preferably 750 microns). It should be noted that the fibers may be able to move along the length of the spacer 10 since the openings are preferably slightly larger than 250 microns. The spacer 10 may be made such that the openings are closer to the size of the coated fibers if the users desire to have a tighter fit between the fibers and the spacer 10.

The fibers 24,26 are preferably each advanced the same amount through the spacer 10. The spacer 10 provides an advantageous holder to allow the user to simultaneously cleave both fibers to an appropriate length for the connector to be used. By cleaving both fibers at the same time, the user will save time and effort and be more assured of having both fibers cleaved at the same length.

Figure 8:
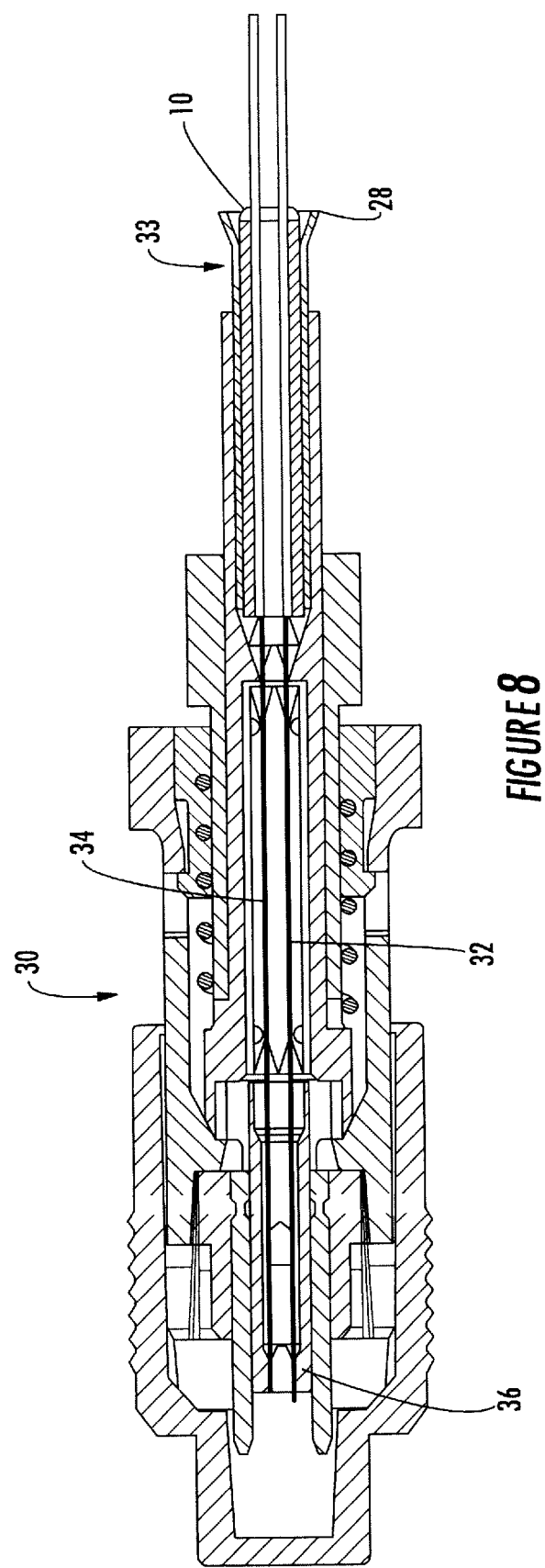
FIG. 8 is a cross sectional view of the connector and spacer of FIG. 7 with the spacer installed therein.

FIG. 7 illustrates how the spacer 10 and the fibers 24,26 are inserted into a connector after having been cleaved. An MT RJ UniCam® connector, available from Corning Cable Systems, is illustrated, although any connector can be used. Since the spacer has positioned the fibers at 750 micron spacing and the outer surface of the spacer 10 is configured to fit within the lead-in tube of the connector, the fibers will correctly align inside the connector. As illustrated in FIG. 8, the fibers 24,26 and spacer 10 are inserted into the lead-in tube 28 of the connector 30. The fibers 24,26 then align with optical fiber stubs 32,34 that are secured within the ferrule 36. The lead-in tube 28 is then crimped around the spacer 10 at 33 to strain relieve the optical fibers 24,26. The spacer 10 sufficiently protects the optical fibers so that they are not bent, crushed, or otherwise affected so as to reduce their optical transmission.

Another embodiment of a spacer is shown in FIGS. 9–11. Spacer 40 is similar to spacer 10, except that the central element 42 has a flared portion 44 at one end 46 rather than an angled end, and it has a flat portion 48 at the other end 50. In this embodiment, only end 50 can be inserted into the connector or lead-in tube. As with the previous embodiment, the openings 14,16 and channel 20 are the same. The openings 14,16 and channel 20 can similarly be modified as described above in reference to spacer 10.

Figure 14:
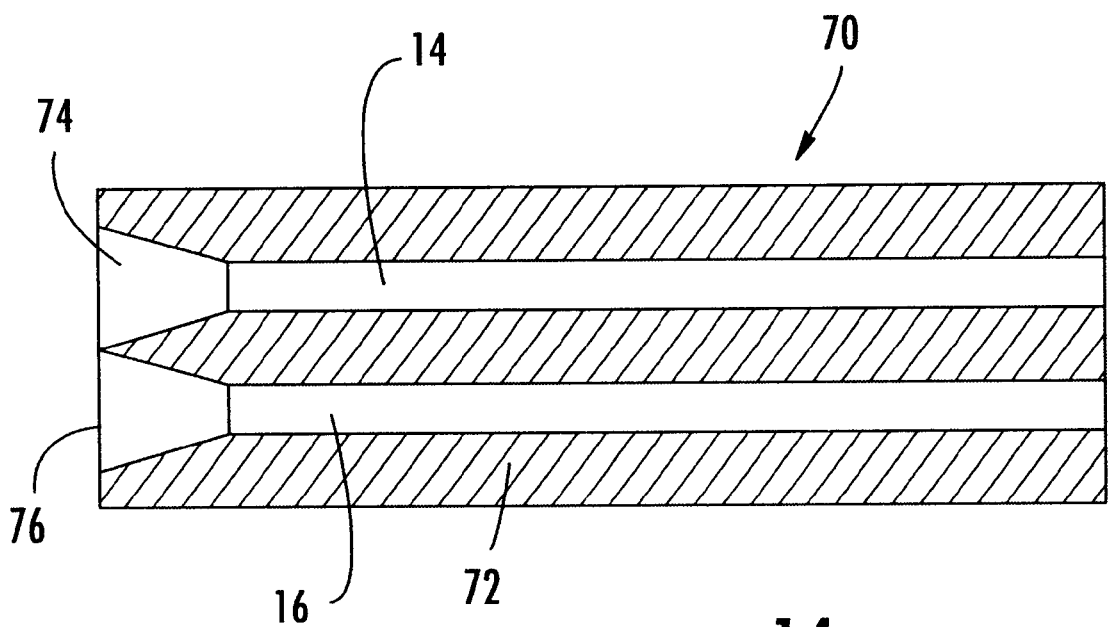
FIG. 14 is a cross sectional view of another embodiment of a spacer according to the present invention.

FIGS. 13 and 14 illustrate another embodiment of a spacer according to the present invention. Spacer 60 has a central elongated element 62 that comprises two cylindrical elements 62a and 62b. As with the previous embodiments, each of the elements 62a and 62b have openings 14,16, but, unlike those embodiments, there is no channel connecting the openings 14,16. The openings are similarly space at 750 microns center-to-center. Spacer 60 has two ribs 68 along each side of elements 62a and 62b that assists in centering the spacer 60 within the connector. One or both ends 64,66 of the spacer 60 may also be angled as with the first embodiment to aid in inserting the optical fibers into openings 14,16.

Figure 15:
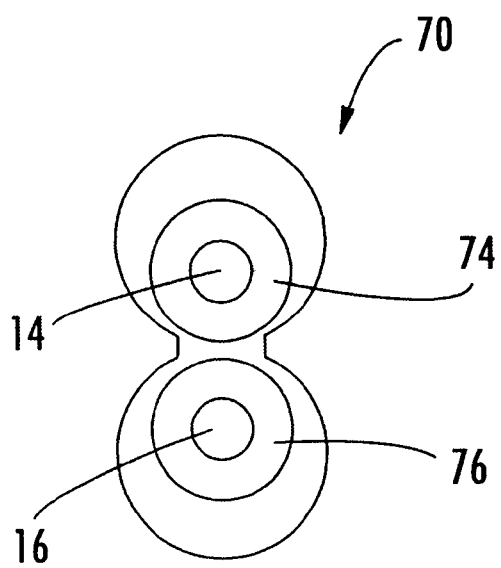
FIGS. 15 and 16 are opposing end views of the spacer of FIG. 14.
Figure 16:
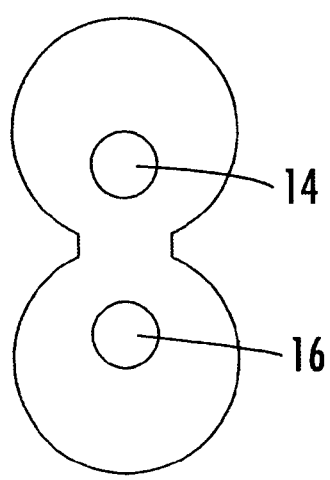

FIGS. 14–16 illustrate another embodiment of a spacer according to the present invention. The spacer 70 has openings 14,16 that extend through the elongated central element 72. Openings 14,16 have a flared portion 74,76 at one end of the spacer 70 to assist the user in inserting optical fibers. As with the previous embodiment, the spacer 70 does not have a channel that allows communication between the openings 14,16. While the spacer 70 generally has a figure eight shape, it could have any shape that would allow it to be inserted into the back of a connector, such as oval, rectangular, etc.

Figure 17:
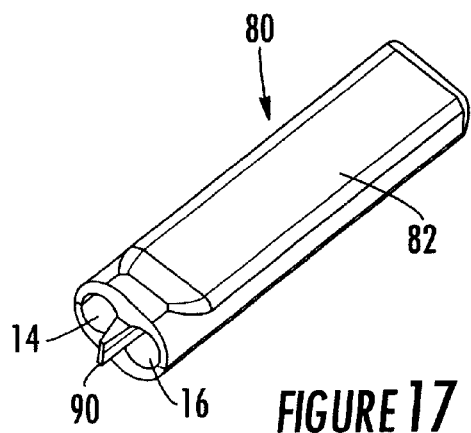
FIG. 17 is a perspective view of another embodiment of a spacer according to the present invention.
Figure 18:
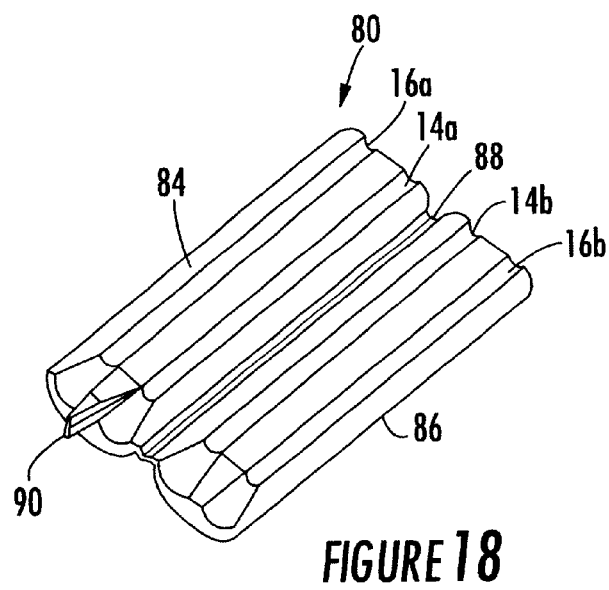
FIG. 18 is perspective view of the spacer of FIG. 17 in an open configuration.
Figure 19:
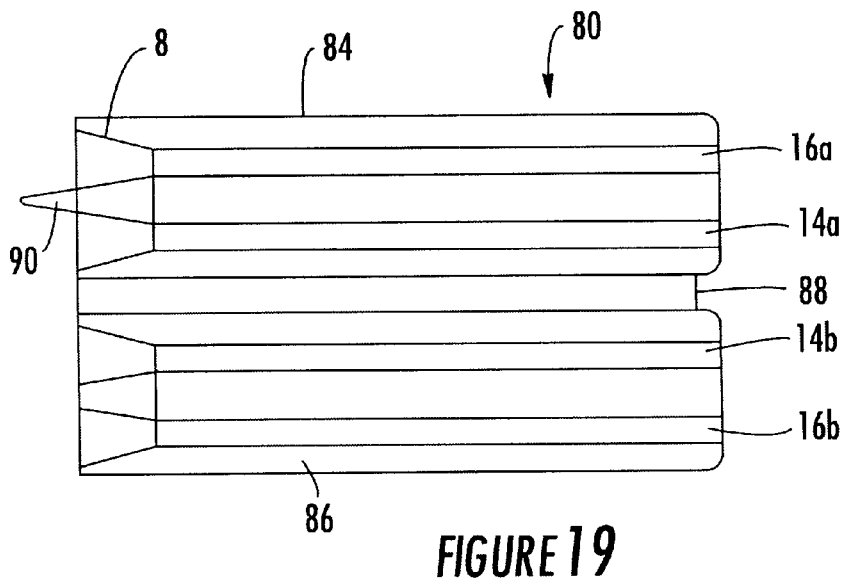
FIG. 19 is a top view of the spacer of FIG. 18.

Another embodiment of a spacer 80 is illustrated in FIGS. 17–19 that has a central element 82. Element 82 has a top 84 and a bottom 86 attached along an edge 88. Openings 14,16 extend through the spacer 80 as in the previous embodiments. The top 84 and the bottom 86 each have concave portions 14a,16a and 14b,16b, respectively, that form openings 14,16 when the top and bottom are mated as shown in FIG. 17. As with several of the previous embodiments, the spacer 80 has a flared entry portion 88,90 at one end of the spacer to assist the user in aligning the fibers with openings 14,16. Also, there is no channel in the spacer 80, so the optical fibers must be inserted into the appropriate opening 14,16 from the start. The spacer 80 may also have a divider or tang 90 that extends outward from the spacer 80 and is disposed between the two openings 14,16 to assist the user in guiding the optical fibers into the correct opening.

Although the present invention has been described with respect to certain preferred and alternative embodiments, it should be understood that various changes, substitutions and modifications may be suggested to one skilled in the art, and it is intended that the present invention encompass such changes, substitutions, and modifications as fall within the scope of the appended claims and their equivalents.

We claim:

1. A spacer for use with a multifiber connector, the spacer comprising:
   an elongated central element, said elongated central element being formed of a resin material and having first and second ends formed thereon;
   at least two openings extending between the first and second ends of the elongated central element; and
   a channel in the elongated central element and in communication with the at least two openings to allow an optical fiber to pass therethrough.

2. The spacer according to claim 1, wherein the channel is sized to allow a 125 micron fiber to pass therethrough.

3. The spacer according to claim 1, wherein the elongated central element has a longitudinal axis, the longitudinal axis being parallel to the openings, and wherein at least one of the first and second ends is oriented at an angle between 30° and 90° relative to the longitudinal axis to allow for easier insertion of optical fibers.

4. The spacer according to claim 1, wherein the at least two openings are each sized for a 250 micron fiber.

5. The spacer according to claim 1, wherein the at least two openings are generally annular.

6. The spacer according to claim 1, wherein the elongated central element has a generally oval shape.

7. The spacer according to claim 1, wherein the openings have centers that are about 750 microns apart.

8. The spacer according to claim 1, the spacer is made of a resilient material.

9. The spacer according to claim 8, wherein the spacer is made of Teflon.

10. The spacer according to claim 1, wherein the spacer is monolithic.

11. The spacer according to claim 1, wherein the spacer is extruded.

12. The spacer according to claim 1, wherein the spacer is injection molded.

13. The spacer according to claim 1, wherein the second end of the elongated central element has a flared portion to allow easier insertion of optical fibers.

14. The spacer according to claim 1, wherein the spacer is configured to fit into a fiber optic connector that is configured to accept at least two 900 Micron optical fibers.

15. The spacer according to claim 1, wherein spacer is configured to fit within a lead-in tube of a fiber optic connector.

16. The spacer according to claim 15, wherein the spacer provides strain relief for the optical fibers when the lead-in tube is crushed around the spacer.

17. A spacer for use with a multifiber connector, the spacer comprising:
   a resilient elongated central element having a first and second end;
   at least two openings extending between the first and second ends of the elongated central element, the openings have centers that are about 750 microns apart; and
   a channel in the elongated central element and in communication with the at least two openings to allow an optical fiber to pass therethrough.

18. The spacer of claim 17, wherein at least one end of the resilient elongated central element has a flared portion to allow easier insertion of optical fibers.

19. A spacer for use with a multifiber connector, the spacer comprising:
   an elongated central element having a first and second end; and
   at least two openings extending between the first and second ends of the elongated central element, said openings being sized for an optical fiber having a diameter of about 250 microns;
   wherein the elongated central element has a longitudinal axis, the longitudinal axis being parallel to the openings, and wherein at least one of the first and second ends is oriented at an angle between about 30° and 90° relative to the longitudinal axis to allow for easier insertion of optical fibers.

20. A spacer fiber use with a multifiber connector, the spacer comprising:
   an elongated central element having first and second ends; and
   at least two openings extending between the first and second ends of the elongated central element, said openings having centers that are about 750 microns apart; and
   wherein the elongated central element is comprised of two halves joined along an edge parallel to the openings.

21. A spacer for use with a multifiber connector, comprising:
   said spacer being formed of a resilient fluorocarbon resin material imparting mechanical resiliency to said spacer, and said spacer comprising an elongated central element having first and second ends, at least two openings extending between said first and second ends and a channel m the elongated central element and in communication with the at least two openings to allow an optical fiber to pass therethrough.

22. A multifiber fiber optic connector assembly, said assembly comprising:
   a spacer, said spacer being formed of a resilient material imparing mechanical resiliency to said spacer, and said spacer comprising an elongated central element having first and second ends, at least two openings extending between said first and second ends and a channel in the elongated central element and in communication with the at least two openings to allow an optical fiber to pass therethrough; and
   a lead-in tube, said spacer being inserted into said lead-in tube, said lead-in tube being crimpable about said spacer, said resiliency inhibiting optical attenuation effects, and providing strain relief and protection of said optical fibers.

23. The assembly of claim 22, said resilient material comprising a fluorocarbon material.

24. The assembly of claim 22, said at least two openings being sized for an optical fiber of about 250 microns in diameter.

25. A spacer for use with a multifiber connector, the spacer comprising:
   an elongated central element, said elongated central element being formed of a resin material and having first and second ends formed thereon; and at least two openings extending between the first and second ends of the elongated central element;

wherein the elongated central element has a longitudinal axis, the longitudinal axis being parallel to the openings, and wherein at least one of the first and second ends is oriented at an angle between about 30° and 90° relative to the longitudinal axis to allow for easier insertion of optical fibers.

26. A spacer for use with a multifiber connector, the spacer comprising:

a resilient elongated central element having a first and second end; and at least two openings extending between the first and second ends of the elongated central element, the openings have centers that are about 750 microns apart and wherein the elongated central element is comprised of two halves joined along an edge parallel to the openings.

* * * * *

UNITED STATES PATENT AND TRADEMARK OFFICE
CERTIFICATE OF CORRECTION

PATENT NO.    : 6,585,421 B1
DATED         : July 1, 2003
INVENTOR(S)   : Brandon A. Barnes and Daniel Leyva, Jr.

It is certified that error appears in the above-identified patent and that said Letters Patent is hereby corrected as shown below:

<u>Column 6,</u>
Line 22, delete "fiber" and add -- for --.
Line 40, delete "m" and add -- in --.

Signed and Sealed this

Thirtieth Day of September, 2003

JAMES E. ROGAN
*Director of the United States Patent and Trademark Office*